(12) United States Patent
Zhou et al.

(10) Patent No.: US 10,663,478 B2
(45) Date of Patent: May 26, 2020

(54) FULLY AUTOMATIC TEST CARD CONVEYING APPARATUS FOR INSTANT TESTING INSTRUMENT

(71) Applicant: HANGZHOU JOINSTAR BIOMEDICAL TECHNOLOGY CO., LTD., Hangzhou, Zhejiang Province (CN)

(72) Inventors: Xuyi Zhou, Hangzhou (CN); Longbin Hong, Hangzhou (CN); Wenjie Xu, Hangzhou (CN); Xiaodong Chen, Hangzhou (CN); Songbing Zhou, Hangzhou (CN); Guojin Shen, Hangzhou (CN); Rui Hu, Hangzhou (CN)

(73) Assignee: Hangzhou Joinstar Biomedical Technology Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 16/156,675

(22) Filed: Oct. 10, 2018

(65) Prior Publication Data

US 2019/0041413 A1 Feb. 7, 2019

Related U.S. Application Data

(63) Continuation-in-part of application No. 15/101,161, filed as application No. PCT/CN2014/094936 on Dec. 25, 2014, now abandoned.

(30) Foreign Application Priority Data

Dec. 26, 2013 (CN) .................... 2013 2 0866370 U

(51) Int. Cl.
*G01N 35/04* (2006.01)
*G01N 35/00* (2006.01)

(52) U.S. Cl.
CPC ....... *G01N 35/04* (2013.01); *G01N 35/00029* (2013.01); *G01N 2035/00148* (2013.01);
(Continued)

(58) Field of Classification Search
None
See application file for complete search history.

(56) References Cited

U.S. PATENT DOCUMENTS 4,248,498 A 2/1981 Georges

FOREIGN PATENT DOCUMENTS

| CN | 102298068 A | 12/2011 |
|---|---|---|
| CN | 202433391 U | 9/2012 |

(Continued)

*Primary Examiner* — Kathryn Wright
(74) *Attorney, Agent, or Firm* — Muncy, Geissler, Olds & Lowe, P.C.

(57) ABSTRACT

A fully automatic test card conveying apparatus for an instant testing instrument is used for conveying a test card and includes a test card conveying arm, frame, push rod, buffer support, buffer cartridge, and card extraction mechanism. A first electric motor, second electric motor, first sliding rail, and second sliding rail are provided on the arm. The frame is connected in a sliding manner to the first sliding rail via a sliding block, and connected to the first electric motor via a first synchronization belt. A stepping motor is provided on the sliding block and an output end of the stepping motor is connected to the frame. The push rod is connected in a sliding manner with the second sliding rail, and connected to the second electric motor via a second synchronization belt.

5 Claims, 3 Drawing Sheets

(52) U.S. Cl.
    CPC ............... *G01N 2035/0462* (2013.01); *G01N 2035/0475* (2013.01); *G01N 2035/0484* (2013.01)

(56) References Cited

FOREIGN PATENT DOCUMENTS

| | | |
|---|---|---|
| CN | 103076461 A | 5/2013 |
| CN | 203612719 U | 5/2014 |
| EP | 0054849 A1 | 6/1982 |
| JP | 4468140 B2 | 5/2010 |

FULLY AUTOMATIC TEST CARD CONVEYING APPARATUS FOR INSTANT TESTING INSTRUMENT

CROSS REFERENCE TO RELATED APPLICATIONS

This application is a Continuation-in-Part of co-pending application Ser. No. 15/101,161, filed on 2 Jun. 2016, which is a U.S. National Stage of International Application No. PCT/CN2014/094936, filed on 25 Dec. 2014, for which priority is claimed under 35 U.S.C. § 120; and this application claims priority of Application No. 201320866370.4 filed in CHINA on 26 Dec. 2013 under 35 U.S.C. § 119.

FIELD OF THE INVENTION

The utility model relates to the technical field of medical testing apparatus, in particular, to a fully automatic test card conveying apparatus for an instant testing instrument.

BACKGROUND OF THE INVENTION

Currently there are many medical testing apparatuses available on the markets, with high degree of automation and high detection capacity; but they require complicated sample pre-treatment processes and a long time of detection cycle, especially the test card conveying mechanism is complicated, with less stability. The existing point-of-care testing (POCT) products can achieve a miniature, immediate and simple bedside testing, but POCT has a common feature—single detection; if there are many clinical samples of specimens in batches or the number of specimens for the same test item in the emergency testing is large, the single, small POCT testing instruments can not meet their requirements; moreover, their degree of automation is not high, requiring manual operation.

SUMMARY OF THE INVENTION

The utility model provides a fully automatic test card conveying apparatus for an instant testing instrument. It has a simple structure and is convenient for conveying.

The utility model is achieved through the following technical solutions:

A fully automatic test card conveying apparatus for an instant testing instrument is used for conveying a test card, comprising a test card conveying arm, a frame, a push rod, a buffer support, a buffer cartridge and a card extraction mechanism, wherein a first electric motor, a second electric motor, a first sliding rail and a second sliding rail are provided on the test card conveying arm, the frame is connected in a sliding manner to the first sliding rail via a sliding block, and is connected to the first electric motor via a first synchronization belt. A stepping motor is provided on the sliding block, and an output end of the stepping motor is connected to the frame. The push rod is connected in a sliding manner with the second sliding rail, and is connected to the second electric motor via a second synchronization belt. The buffer support is arranged on one side of the test card conveying arm, provided with a third motor and a third sliding rail, the buffer cartridge is connected with the third sliding rail in a sliding manner and connected to the third electric motor via a third synchronization belt. The card extraction mechanism is arranged on the frame.

The card extraction mechanism comprises a first DC electric motor, a screw rod, a test card bracket, a fourth sliding rail and a hook bar. The test card bracket and the fourth sliding rail are fixed on the frame. The hook bar is connected with the fourth sliding rail in a sliding manner; the output end of the first DC electric motor is provided with a driving wheel; one end of the screw rod is provided with a driven wheel, and the other end is connected with the hook bar. The driving wheel is meshed with the driven wheel.

The buffer cartridge comprises a plurality of longitudinally arranged buffer brackets.

A holder block is arranged on the test card conveying arm, and the holder block is provided with a photoelectric sensor.

The utility model can achieve the following beneficial effects:

The fully automatic test card conveying apparatus for an instant testing instrument in the utility model is used for preparation for the subsequent testing by taking out the test card from the stack and putting into the buffer cartridge. The card extraction mechanism can rotate corresponding angle driven by the first DC electric motor to convey the detection card to the buffer cartridge. The hook bar can stretch into the stack to take the detection card driven by a stepping motor, and hook the detection card into the test card bracket. The frame rotates 90° driven by the stepping motor. The buffer cartridge can move up and down driven by the third motor, to convey the detection card into any one buffer bracket in the buffer cartridge for temporary storage. The push rod can push the detection card into the buffer bracket driven by the second electric motor when the frame is butted against the buffer cartridge. The photoelectric sensor is used for induction of the detection card passing from below and counting. The holder block is provided with a photoelectric sensor to monitor whether the detection card is available, and monitor whether the detection card is successfully conveyed to the buffer cartridge, to identify the barcodes of the detection card, so as to ensure the stable conveying.

BRIEF DESCRIPTION OF THE DRAWINGS

The utility model is further described in combination with the drawings.

The names of parts in the figures are as follows.

1, test card; 2, test card conveying arm; 3, frame; 4, push rod; 5, buffer support; 6, buffer cartridge; 7, first electric motor; 8, second electric motor; 9, first sliding rail; 10, second sliding rail; 11, sliding block; 12, first synchronization belt; 13, stepping motor; 14, second synchronization belt; 15, third motor; 16, third sliding rail; 17, third synchronization belt; 18, first DC electric motor; 19, screw rod; 20, test card bracket; 21, fourth sliding rail; 22, hook bar; 23, driving wheel; 24, driven wheel; 25, buffer bracket; 26, holder block; 27, photoelectric sensor.

DETAILED DESCRIPTION OF THE PREFERRED EMBODIMENTS

The utility model is further described in details in combination with drawings and embodiments.

Figure 1:
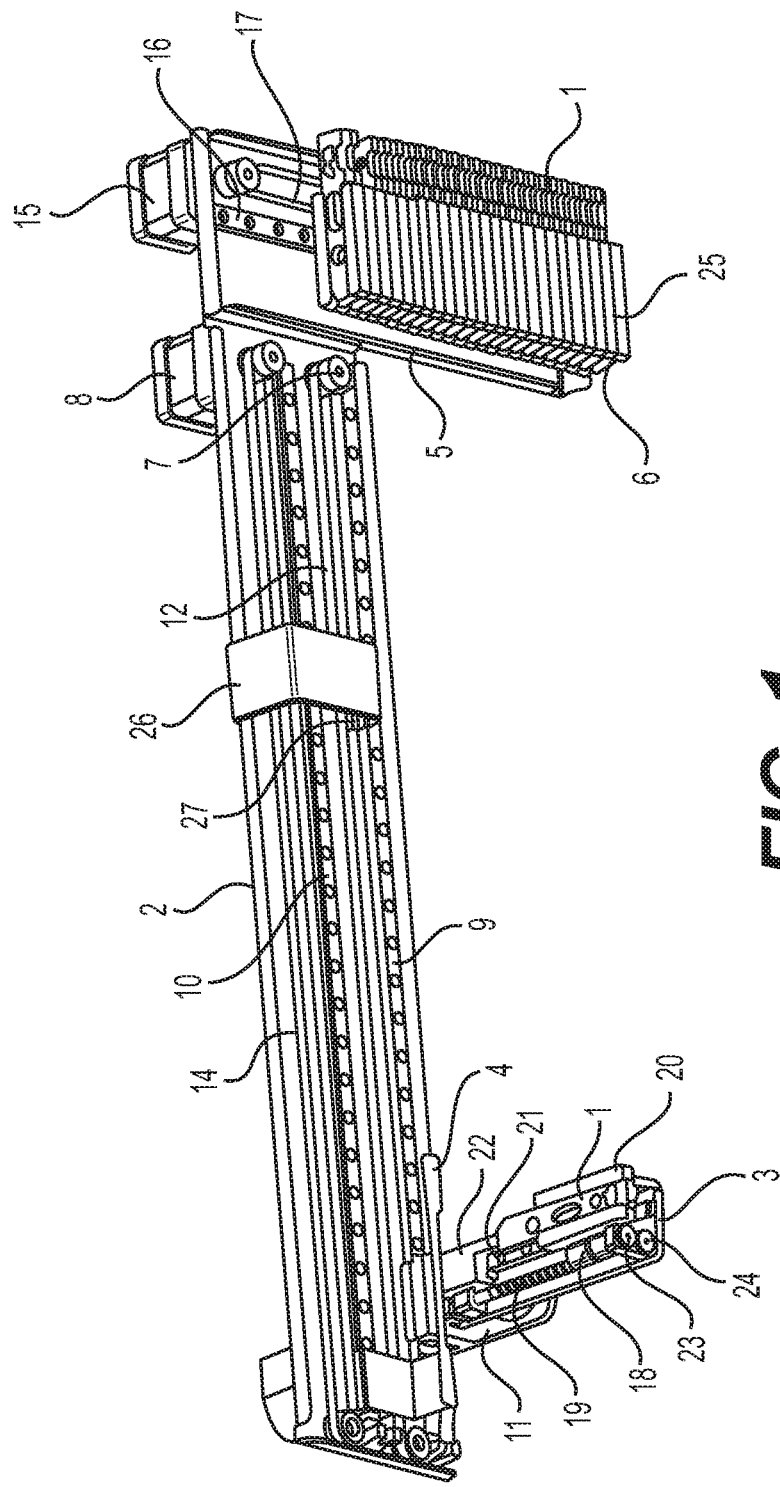
FIG. 1 is a schematic diagram of a fully automatic test card conveying apparatus for an instant testing instrument under the first state.
Figure 2:
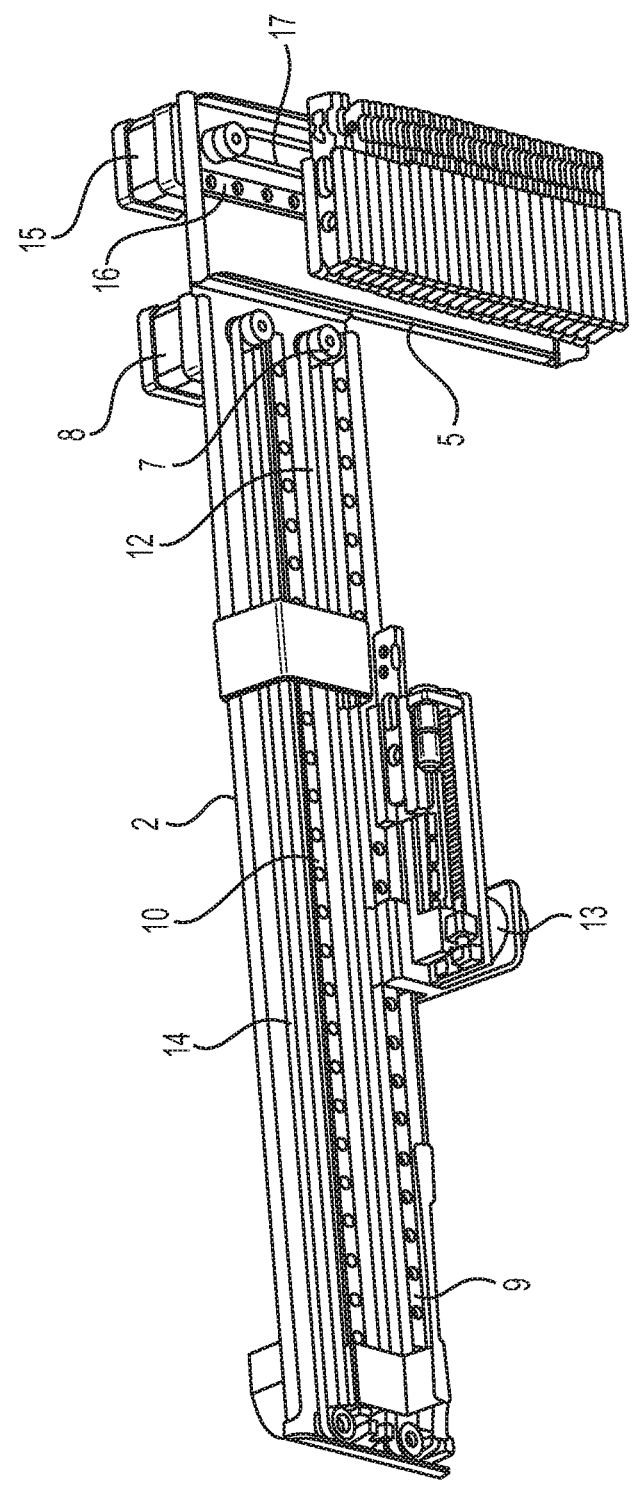
FIG. 2 is a schematic diagram of a fully automatic test card conveying apparatus for an instant testing instrument under the second state.
Figure 3:
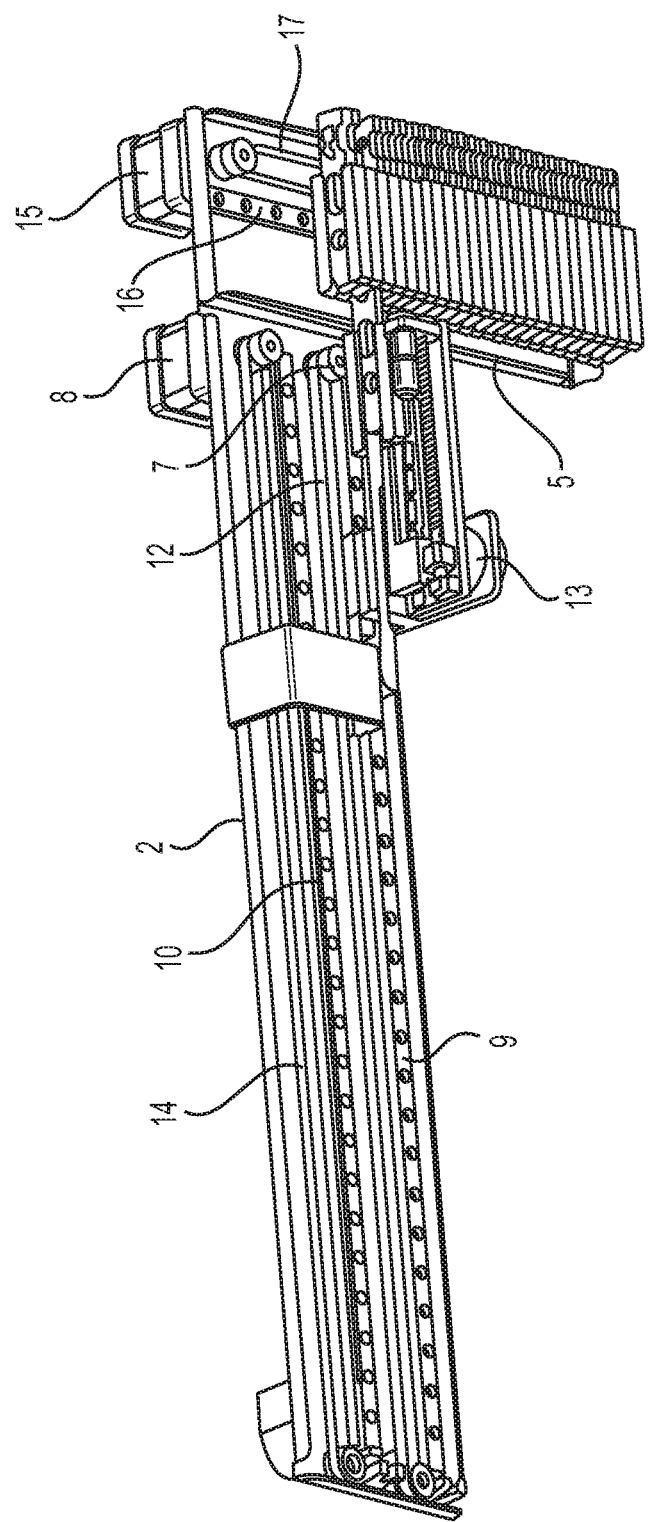
FIG. 3 is a schematic diagram a fully automatic test card conveying apparatus for an instant testing instrument under the third state.

By referring to FIG. 1, FIG. 2 and FIG. 3, a fully automatic test card conveying apparatus for an instant testing instrument is used for conveying a test card 1, comprising a test card conveying arm 2, a frame 3, a push rod 4, a buffer support 5, a buffer cartridge 6 and a card extraction mechanism, wherein a first electric motor 7, a second electric motor 8, a first sliding rail 9 and a second sliding rail 10 are provided on the test card conveying arm 2, the frame 3 is connected in a sliding manner to the first sliding rail 9 via a sliding block 11, and is connected to the first electric motor 7 via a first synchronization belt 12. A stepping motor 13 is provided on the sliding block 11, and an output end of the stepping motor 13 is connected to the frame 3. The push rod 4 is connected in a sliding manner with the second sliding rail 10, and is connected to the second electric motor 8 via a second synchronization belt 14. The buffer support 5 is arranged on one side of the test card conveying arm 2, provided with a third motor 15 and a third sliding rail 16, the buffer cartridge 6 is connected with the third sliding rail 16 in a sliding manner and connected to the third electric motor 15 via a third synchronization belt 17. The card extraction mechanism is arranged on the frame 3. The buffer time of the detection card 1 in the buffer cartridge 6 is controllable, and different buffer time can be set depending on the specific test items.

In this embodiment, the card extraction mechanism comprises a first DC electric motor 18, a screw rod 19, a test card bracket 20, a fourth sliding rail 21 and a hook bar 22. The test card bracket 20 and the fourth sliding rail 21 are fixed on the frame 3. The hook bar 22 is connected with the fourth sliding rail 21 in a sliding manner; the output end of the first DC electric motor 18 is provided with a driving wheel 23; one end of the screw rod 19 is provided with a driven wheel 24, and the other end is connected with the hook bar 22. The driving wheel 23 is meshed with the driven wheel 24.

In this embodiment, the buffer cartridge 6 comprises twenty-five longitudinally arranged buffer brackets 25.

In this embodiment, a holder block 26 is arranged on the test card conveying arm 2, and the holder block 26 is provided with a photoelectric sensor 27.

Refer to FIG. 1. Start the first DC electric motor (18), to drive the driven wheel (24) through the driving wheel (23) connected thereto, and the driven wheel (24) drives the hook rod (22) via the screw rod (19) along the fourth sliding rail to pull the hooked test card (1) into the test card bracket (20).

Refer to FIG. 2. The stepping motor (13) works to drive the entire card extraction mechanism on the frame body (3) to rotate 90° laterally.

Refer to FIG. 3. The first electric motor (7) drives the sliding block (11) with the entire card extraction mechanism on the frame body (3) through the first synchronization belt (12) connected thereto, move them to one end of test card conveying arm (2), which the buffer support (5) is located.

Refer to FIG. 3. The height of the buffer support (5) in the buffer cartridge (6) is adjusted through the third motor (15), the third slide rail (16), the third synchronous belt (17), to allow the empty buffer support (5) at the same height as the card extraction mechanism.

The push rod 4 is connected in a sliding manner with the second sliding rail 10, and is connected to the second electric motor 8 via a second synchronization belt 14. So, the push rod (4) pushes the test card (1) on the card extraction mechanism to the empty buffer support (5) of the buffer cartridge (6).

Thus, in the described test card conveying apparatus, the whole process of test card conveying is divided to five simple motions. and use five motors in charge with each motion respectively to convey the test card to the buffer support (5) in the buffer cartridge (6). It is very simple, and is easy to be monitored, every movement is stable. The whole motion of test card conveying can be controlled automatically.

In the described test card conveying apparatus, the buffer cartridge (6) has a plurality of longitudinally arranged buffer brackets. The buffer time of the detection card 1 in the buffer cartridge 6 is able to be controlled, and different buffer time can be set depending on the specific test items, so can meet the desired throughput requirement if the clinical samples of specimens are in batches or the number of specimens for the same test item in the emergency testing is large.

The invention claimed is:

1. A fully automatic test card conveying apparatus for a testing instrument is used for conveying a test card, comprising:

a test card conveying arm including a first electric motor, a second electric motor, a first sliding rail, and a second sliding rail, wherein the first and second sliding rail are parallel to each other along a first direction;

a frame attached to the test conveying arm and configured to hold a test card thereon;

a buffer support that includes a movable buffer cartridge having a plurality of longitudinally arranged brackets each for storing test cards, wherein the buffer cartridge moves in a second direction perpendicular to the first direction;

a push rod configured to push the test card on the frame onto one of the plurality of longitudinally brackets on the buffer support; and a holder block including a photoelectric sensor is arranged on the test card conveying arm, wherein the frame is connected in a sliding manner to the first sliding rail via a sliding block so as to slide in the first direction on the first sliding rail, and the frame is connected to the first electric motor via a first synchronization belt, the push rod is connected in a sliding manner to the second sliding rail so as to slide in the first direction on the second sliding rail, and is connected to the second electric motor via a second synchronization belt, a stepping motor is provided on the sliding block, and an output end of the stepping motor is connected to the frame, the buffer support is arranged on one side of the test card conveying arm, provided with a third electric motor and a third sliding rail, the buffer cartridge is connected with the third sliding rail in a sliding manner and connected to the third electric motor via a third synchronization belt.

2. The fully automatic test card conveying apparatus for an instant testing instrument according to claim 1, wherein the frame comprises a first DC electric motor, a screw rod, a test card bracket, a fourth sliding rail and a hook bar, the test card bracket and the fourth sliding rail are fixed on the frame, the hook bar is connected with the fourth sliding rail in a sliding manner, the output end of the first DC electric motor is provided with a driving wheel, one end of the screw rod is provided with a driven wheel, and the other end is connected with the hook bar, the driving wheel is meshed with the driven wheel.

3. The fully automatic test card conveying apparatus for an instant testing instrument according to claim 1, wherein the stepping motor rotates the frame between the first direction and a second direction perpendicular to the first direction.

4. The fully automatic test card conveying apparatus for an instant testing instrument according to claim 1, wherein when the second electric motor is actuated, the push rod slides on the second sliding rail and pushes the test card on the frame to the buffer support.

5. The fully automatic test card conveying apparatus for an instant testing instrument according to claim 1, wherein a length of the first sliding rail and a length of the second sliding rail are substantially equal to each other.

\* \* \* \* \*